Oct. 23, 1962 P. FAHLENBERG ET AL 3,059,558
PHOTOGRAPHIC CAMERA FOCUSING MECHANISM
Filed April 27, 1959 3 Sheets-Sheet 1

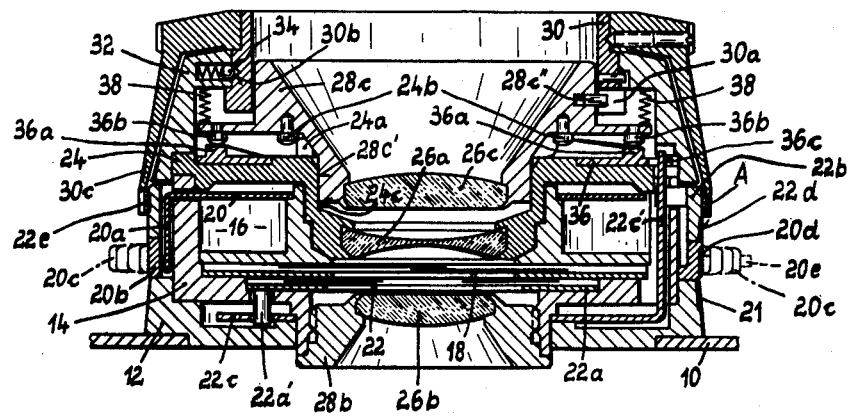
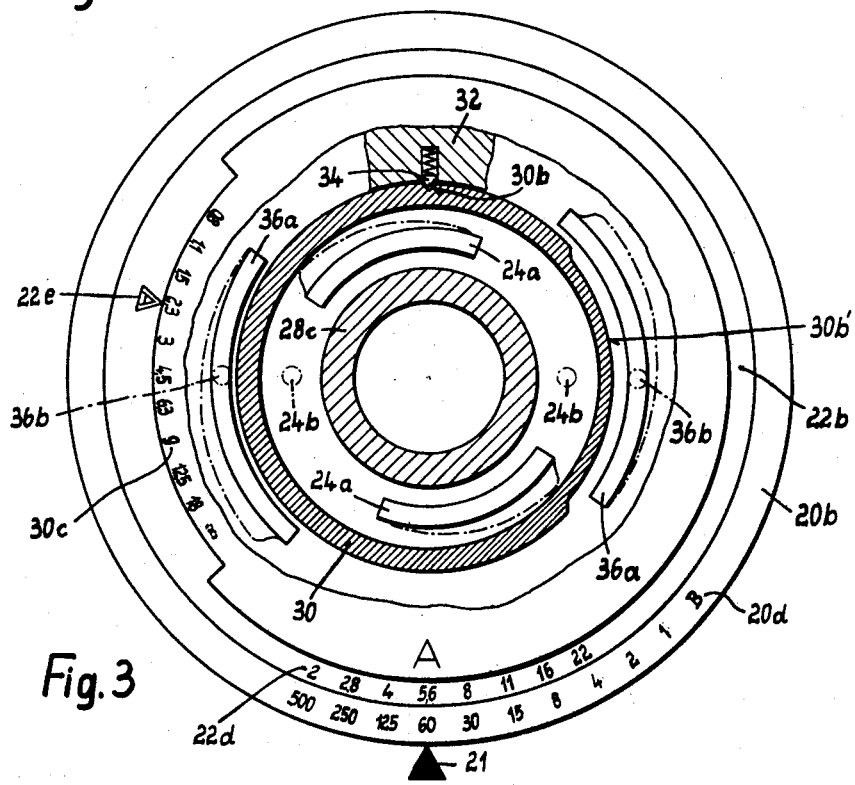

United States Patent Office 3,059,558
Patented Oct. 23, 1962

3,059,558
PHOTOGRAPHIC CAMERA FOCUSING
MECHANISM
Paul Fahlenberg, Baierbrunn, near Munich, and Kurt Gebele and Franz Singer, Munich, Germany, assignors to Compur-Werk G.m.b.H. & Co., Munich, Germany, a firm of Germany
Filed Apr. 27, 1959, Ser. No. 809,135
Claims priority, application Germany Apr. 30, 1958
5 Claims. (Cl. 95—64)

This invention relates to focusing mechanism for a photographic camera.

An object of the invention is the provision of generally improved and more satisfactory focusing mechanism.

Another object is the provision of mechanism so designed that the camera may be focused in a plurality of different ways, according to the expertness of the photographer or according to the nature of the photograph that is to be taken.

Still another object is the provision of focusing mechanism capable of being coupled, for instance, to the diaphragm mechanism, to provide automatic focusing in accordance with the size of the diaphragm aperture, and capable also of being uncoupled from the diaphragm mechanism, when it is desired to focus manually, thus providing a camera suitable for use by a beginner for whom the adjusting operations can be performed largely automatically, or for use by an expert who wishes the fullest freedom to make adjustments at his own discretion, before taking the photograph.

A further object is the provision of focusing mechanism of the general character above outlined, so designed and constructed as to be relatively simple and inexpensive to manufacture, and sturdy in use.

These and other desirable objects may be attained in the manner disclosed as an illustrative embodiment of the invention in the following description and in the accompanying drawings forming a part hereof, in which:

FIG. 2 is a diametrical section taken axially through the shutter and objective mount and the focusing mechanism;

FIG. 3 is a schematic front elevation of certain of the parts shown in FIG. 2, with parts broken away and parts in transverse section, showing the mechanism adjusted to one position;

The same reference numerals throughout the several views indicate the same parts.

Figure 1:
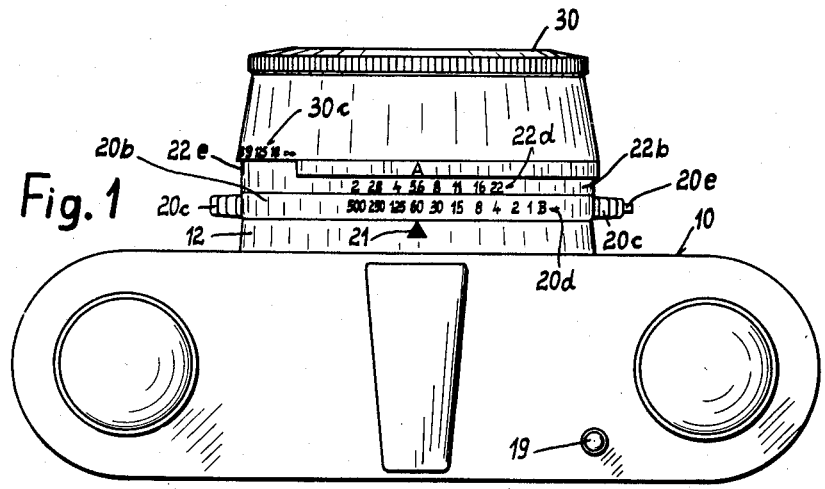
FIG. 1 is a top plan view of a camera in accordance with one embodiment of the present invention.

The present invention may be applied to a camera of any conventional construction or type. For example, the camera may have a body 10, to the front wall of which there is secured a mounting ring or holder 12 for supporting the shutter housing or casing 14, constituting the main body of the entire optical unit (shutter and lens unit). This objective unit may be of the conventional annular shape having the optical axis extending centrally through it. It contains, largely within the annular space 16, the usual actuating and control mechanism for moving the shutter blades 18 to open and close them to make an exposure. The blade operating mechanism may be of any conventional kind, the details of which are not important so far as the present invention is concerned. For example, the operating mechanism may be of the kind shown in Deckel and Geiger Patent 1,687,123, or of the kind disclosed in Singer Patent 2,785,612, or of any other conventional form. Preferably the master member of the shutter is cocked or tensioned by the operation of the film winding mechanism of the camera, in known manner, and is released or triggered for making an exposure by depressing the push button control plunger 19 on the camera body.

At the front of the shutter housing 14 there is the usual shutter speed control ring 20 having cam portions for adjusting the shutter speed in the familiar manner, being for instance like the speed control ring 63 in the above mentioned Patent 1,687,123. The speed control ring 20 preferably has also a rearwardly extending arm 20a engaging and operatively coupled with the external shutter speed setting ring 20b mounted for rotation about the optical axis, in an externally accessible position on the shutter housing. The ring 20b preferably has a pair of diametrically opposite grip members or handles 20c for easy manual turning. The periphery of the ring 20b is marked circumferentially with a shutter speed scale 20d which can be read in conjunction with a fixed reference mark 21 mounted in any convenient location, such as being on the fixed mounting ring 12.

The optical unit also contains, as usual, an adjustable diaphragm, preferably of the iris type, having adjustable diaphragm leaves 22 connected in the usual way to and operated by a diaphragm control ring 22a rotatable in the shutter housing 14 near the rear thereof. There is also an external diaphragm aperture control ring or setting ring 22b rotatable on the outside of the optical unit or shutter unit, just forwardly of the speed control ring 20b. The external aperture setting ring 22b is operatively connected to the internal aperture setting ring 22a in any convenient manner, the details of which are not important to the present invention. To provide one convenient way of connecting these two rings to each other, the ring 22a may carry a rearwardly extending pin 22a' engaging in an opening in a ring 22c rotatable on the rear of the shutter housing, which ring 22c has a forwardly extending arm 22c' engaging in a radial slot formed in a lug on the ring 22b, so that all three of the members 22a, 22b, and 22c are coupled to each other to rotate together. The external diaphragm adjusting or setting ring 22b may carry a diaphragm aperture scale 22d marked circumferentially on it, and read in conjunction with the same fixed index mark 21 which is used for reading the shutter speed scale.

Any known form of releasable coupling may be provided between the two setting or adjusting rings 20b and 22b, to permit the shutter speed and the diaphragm aperture to be simultaneously adjusted in a complementary manner to change the pair of values of shutter speed and diaphragm aperture, without affecting the exposure value. See, for example, the discussion of exposure value setting principles in Gebele Patent 2,829,574. Any convenient known form of coupling means may be used, preferably a coupling which may be released or disconnected by pushing radially inwardly on a push button 20e mounted on one of the grip members or handles 20c. Thus the coupling and disconnecting or decoupling mechanism may be of the form shown, for example, in FIGS. 4 and 5 of the copending application of Kurt Gebele, Serial No. 803,204, filed March 31, 1959 (now Patent 3,044,376, granted July 17, 1962), wherein the plunger 22d may correspond to the present plunger 20e, although in said pending application the coupling is between different members for a different purpose.

Mounted in stationary position on the front of the shutter housing 14 there is a mounting member or base plate 24 secured to the housing 14 as for example by a number of screws. As above mentioned, this invention deals in part with the focusing of the camera, and the lens is conveniently of the type having one or more elements or components which remain fixed during the focusing operation, and one or more elements or components which move axially during focusing. There may be, for example, a fixed lens element 26a mounted on the base plate 24 and lying a short distance in front of the shutter blades 18. There may also be another fixed lens element or component 26b, held in a mount member 28b screwed into the usual rear lens tube of the shutter housing. There is also another lens element or component 26c, axially movable for focusing and located in front of the fixed element 26a.

This element 26c is held in a focusing mount 28c which has a cylindrical extension 28c' guided in a cylindrical bore 24c of the base plate 24. Fitted into the mount 28c is a radial pin 28c" which is engaged in an axial slot 30a in a control ring 30 rotatable in a stationary ring-shaped front plate 32 which is secured to the shutter housing 14 or the base plate 24.

The ring 32 has a radial bore containing a spring pressed ball 34 urged radially inwardly against the ring 30. When a notch or recess 30b on the ring 30 is opposite the ball 34, the ball serves as a detent tending to hold the ring 30 against rotation. However, the ring 30 may be rotated from this position (FIG. 3) to another position (FIG. 4) where a circumferentially elongated recess 30b' of the ring 30 lies opposite the ball 34, the circumferential length of this recess determining the angular range through which the ring 30 may be easily rotated without having to displace the ball 34 against the force of its spring.

This embodiment of the invention provides two focusing mechanisms which can be optionally or selectively employed for focusing the objective; that is, for axially displacing the front lens element or component 26c. The first of these focusing mechanisms comprises a control ring 36 rotatably mounted on the front face of the base plate 24. This ring 36 carries two cam elements 36a each arranged arcuately around the optical axis as a center, and located diametrically opposite each other, each of these cam elements having an axial rise; that is, a rise in a direction parallel to the optical axis about which the ring 36 rotates. The above mentioned front lens mount 28c carries two cam follower pins 36b in proper position to overlie and engage with the cam rise surfaces of the cam elements 36a.

The second focusing mechanism comprises two cam elements 24a on the fixed base plate 24, these elements being diametrically opposite each other (with respect to the optical axis) and arcuately extending around the optical axis concentrically therewith, and having a rise in an axial direction, like the rise of the other cam elements 36a. The front lens mount 28c has two other cam follower pins 24b in a position to overlie and engage with these latter two cams 24a. However, the cams 36a are angularly displaced in relation to the cams 24a, in such relation that only one or the other of the pairs of cams can be in operative contact with the associated cam follower pins at a time. In other words, when the cam follower pins 36b are in contact with the cams 36a, the other cam follower pins 24b are out of contact with the other cams 24a, and vice versa. One or preferably several springs 38, spaced equidistantly in a circumferential direction, are disposed between the front plate 32 and the mount 28c, to urge the mount resiliently rearwardly so as to keep the cam follower pins in contact with the front faces of the cams of one or the other pair.

Before describing the detailed operation of this embodiment of the invention, it may be convenient to review briefly some of the fundamental relationships existing between the size of the diaphragm aperture, the depth of field, and the focused distance. It is well known in the art that, for an objective lens of a given focal length and for a given size of circle of confusion, the depth of field varies inversely with the size of the diaphragm aperture. The depth of field is, of course, the field space between the nearest and farthest points which will be in acceptably sharp focus or good definition, for any given focus setting of the lens. When the size of the diaphragm aperture is reduced, the depth of field becomes greater, and when the size of the diaphragm aperture is increased, the depth of field becomes less. At very small diaphragm apertures it is possible for the depth of field to extend theoretically beyond the infinity point, and this excess depth of field will be, of course, wasted and not utilized.

This wastage of available depth of field can be avoided, and the adjustment can be facilitated, if the setting members for the diaphragm aperture and for focusing the lens are coupled together in such a way that, on the one hand, when adjusting the diaphragm to a fairly large opening, the lens will be focused to a more distant point and, on the other hand, the adjusting means for focusing the objective and setting the diaphragm aperture are suitably correlated to insure that the distant point of the depth of field is always at the infinity point. In such a combination of diaphragm size and focused distance, a change in the size of the diaphragm aperture will cause a change in the distance to which the lens is focused and the resultant depth of field will always extend to infinity from the variable point of good definition nearest the camera. That is, if the diaphragm aperture and the focus setting of the lens are properly correlated, the camera will always be focused for all objects from the near point of the depth of field, to the infinity point. Therefore, for practical purposes, it will only be necessary to indicate to the operator the near point of the depth of field, and it will not be necessary to indicate the actual distance for which the lens is theoretically focused, nor the far point of the depth of field, because the far point will always be at infinity, and the theoretical focus point is no longer of importance if the near point of the depth of field is indicated and if it is known that the camera is in sharp focus for all objects between this near point and the infinity point.

The desired relationship between diaphragm aperture and focus distance as set forth above can be established only if the diaphragm aperture setting or adjusting mechanism and the focus setting or adjusting mechanism are correlated with each other in such a way that the respective scales (diaphragm aperture scale and focus scale) are coordinated and brought into appropriate agreement. Therefore, if the diaphragm setting mechanism is so designed that the diaphragm aperture scale is equally divided, to enable adjustment of the camera in terms of exposure values, with coupling of the shutter speed adjustment to the diaphragm aperture adjustment (see the discussion in Gebele Patent 2,829,574) whereby adjacent scale values are spaced equally from each other and differ from each other by a factor of the square root of 2, then the focus distance scale must be correlated to conform to the same law of progression.

In the present described form of construction, a connection between the diaphragm setting or adjusting mechanism and the focusing mechanism is provided by extending the arm 22c' of the diaphragm mechanism forwardly to engage in a slot 36c of the control ring 36, so that this control ring 36 is operatively connected to and turns with the external diaphragm aperture setting or adjusting ring 22b and the internal diaphragm adjusting ring 22a. Consequently, the first of the focusing mechanisms, including the cam parts 36a and the cam follower pins 36b, will be actuated by the diaphragm setting mechanism. This manner or method of focusing will hereafter be referred to as "automatic." When the necessary change-over has been effected, the second focusing mechanism, including the cams 24a and the cam follower pins 24b, can be actuated by the manual rotational adjustment of the control ring 30. This permits the camera to be focused independently of the diaphragm setting, and will be hereafter referred to as "individual focusing."

The change-over from one focusing means to the other is effected by rotating the control ring 30 in such a way that when automatic focusing is desired, a mark A on the periphery of the ring 30 will be in register with the principal index mark or reference point 21. The diaphragm setting ring 22b carries a reference mark 22e which now lies opposite one or another of the divisions of the focusing distance scale 30c marked on the circumferential skirt or flange of the focusing ring 30. At this time also, the spring pressed ball 34 will be engaged with the notch 30b of the focusing ring 30, holding the focusing ring resiliently against rotation. However, if it is desired to use individual focusing rather that automatic focusing, then the focusing ring 30 is manually turned with enough force to snap the spring pressed detent ball 34 out of the notch 30b, and turning is continued until the circumferentially elongated recess 30b' comes opposite the ball 34 and the ball snaps into this recess. This rotation of the focusing ring 30 (from the position of FIG. 3 to the position of FIG. 4) brings the focus distance scale 30c to a position opposite the main reference mark 21, to be read from this reference mark, and at the same time, it brings a flange on the skirt of the ring 30 in overlying relation to the mark 22e to cover this mark so that the operator will not be confused thereby.

The operation of the mechanism is as follows: With due regard to the speed or sensitivity of the film being used, the photographer measures or estimates the exposure value required for taking the contemplated photograph. He presses radially inwardly on the decoupling button 20e, to disconnect the exposure value coupling between the diaphragm setting ring and the speed setting ring, and then turns the speed setting ring 20b as required in order to provide the proper relationship between speed and aperture to give the desired exposure value, whereupon the decoupling button 20e is released, so that the coupling between speed and aperture again becomes effective, and different pairs of speed setting and aperture setting may be selected at will by turning the rings 20b and 22b together by means of the handles 20c, without changing the exposure value.

If the photographer now desires to make use of automatic focusing, he must first make sure that the control ring 30 is in that position in which the mark A registers with the mark 21, as shown in FIG. 3. If the ring is not already in this position, it must be turned manually to bring it to this position, and it will thereafter remain in this position (until forcibly turned to another position) by reason of the engagement of the spring pressed detent ball 34 in the notch 30b. In this position of the control ring 30, and of the front lens mount 28c which turns with it, the cam follower pins 36b will overlie the cams 36a on the control ring 36, so that the axial position of the lens mount 28c will be determined by the elevation of the particular portions of the cams 36a with which the pins 36b are in engagement at the moment.

Now if the diaphragm setting ring 22b and speed setting ring 20b are rotated to select a different pair of shutter speed and diaphragm aperture values, this will turn the cam ring 36 to a corresponding extent, and a corresponding axial displacement of the front lens mount 28c will result, because a different portion of each cam 36a will now underlie its respective follower pin 36b. The control ring 30 remains stationary during this operation, but the rotation of the diaphragm aperture ring 22b moves the index mark 22e to a different position, opposite a different graduation of the focus distance scale 30c marked on the now stationary ring 30, or rather, on the rearwardly extending marginal skirt or flange of this ring.

As already indicated, the relationship of the reference mark 22e to the graduations of the focus distance scale 30c does not indicate the distance for which the lens is most sharply focused, in the usual sense of the focusing distance scale, but rather indicates the distance of the closest point or near limit of the depth of field. In the example shown diagrammatically in FIG. 3, the shutter speed ring 20b is set for a shutter speed of 60, meaning 1/60 of a second, and the diaphragm aperture ring 22b is set for an aperture of f:5.6, and the reference mark 22e indicates that the near limit of the depth of field is at 2.3 meters from the camera. The operator then knows that all objects from 2.3 meters to infinity are within acceptably sharp focus, and no further attention need be paid to focusing so long as the object is at least 2.3 meters from the camera. The cams 36a are so designed, of course, that in this particular position of the cam ring 36, the cams have pushed the lens mount 28c forwardly (against the force of the springs 38) to the required amount to focus the lens in such a way that the near point or limit of the depth of field will be at the indicated distance of 2.3 meters and the far point or limit of the depth of field will be at infinity. As understood in the art, the lens will be focused at what is called the hyperfocal distance, but this is unimportant so far as the user of the camera is concerned, for all he needs to know about the focus distance scale, when using automatic focusing according to the present invention, is that everything from the indicated distance of 2.3 meters to infinity will be in sufficiently sharp focus.

If now the photographer turns the diaphragm aperture adjusting ring 22b one step or graduation counterclockwise to an aperture value of f:4, for the purpose of taking another photograph, the cam ring 36 will be correspondingly turned so that the cams 36a slide under their respective follower pins 36b to bring slightly lower portions of the cams under the pins, thus permitting the restoring springs 38 to push the lens mount 28c axially rearwardly, to focus the lens for a slightly greater distance. At the same time, the rotation of the ring 22b will move the reference mark 22e one step further along the distance scale 30c, so that it will now indicate that the closest point of the depth of field is at 3 meters.

The distance scale is graduated in any suitable units of distance, such as feet or yards or meters. In the example shown, the distance scale is graduated in meters, from a minimum value of 0.8 to a maximum value of 18 meters. Beyond the highest numerical value of the scale, the infinity symbol is also included in the scale, but this does not serve as an indication of the near limit of the depth of field, being provided only for a purpose that will later be described.

Figure 4:
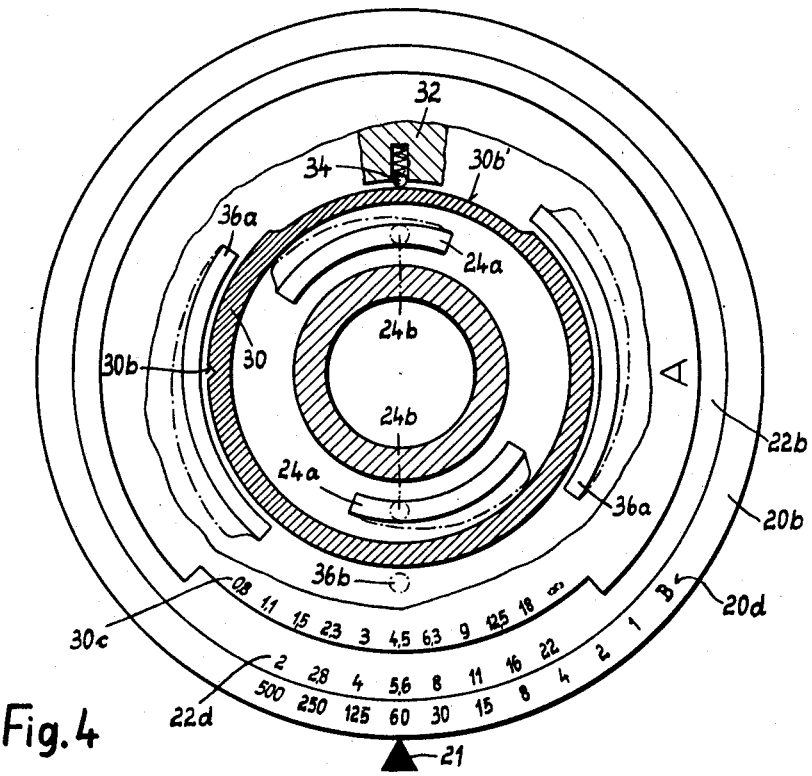
FIG. 4 is a view similar to FIG. 3 showing the parts adjusted to a different position.

If the photographer desires to use individual focusing independently of diaphragm setting, rather than the automatic focusing arrangement previously described, he grasps the control ring 30 (which is conveniently provided with a knurled rim as shown, for easy grasping and turning) and turns this ring with enough force to force the spring detent ball 34 out of the notch 30b, and continues the turning in a counterclockwise direction until the spring pressed ball drops into the circumferentially elongated recess 30b', as seen in FIG. 4. This rotation also brings the focus distance scale 30c into cooperative relation with the main reference point or mark 21. Also the cam follower pins 36b are carried around to positions entirely away from the cams 36a, and the other cam follower pins 24b are now brought into overlying relation to the cams 24a. Thus the focusing will now be controlled by the cams 24a, on the stationary plate 24, rather than by the cams 36a on the rotatable ring 36.

The focus distance scale 30c is now read by reference to the index mark 21, rather than by reference to the mark 22e. The focusing cams are so designed that the scale graduation (of the scale 30c) which is opposite the index mark 21 will now indicate, not the distance of the camera from the near end of the depth of field, but rather the actual distance from the camera to the point at which the lens is most sharply focused. This is controlled, of course, by the circumferential position, or position of orientation, at which the distance scale 30c is placed, with respect to the rise characteristics of the cams 24a. Of course the scale could be so oriented, if desired, that it would indicate the near limit of the depth of field during individual focusing operations, as well as during automatic focusing operations. However, it is preferred to place the scale in such relation to the cams that the scale indicates actual focus distance (or sharpest focusing distance) when operating according to "individual" focusing, and indicates the near limit of the depth of field during "automatic" focusing operations, the latter being accomplished by properly placing the index mark 22e with respect to the rise characteristics of the cams 36a.

Because the distance scale indicates actual focusing distance rather than depth of field limit, during individual focusing, it follows that it is desirable to place the infinity symbol in the proper position at one end of the distance scale, for use during individual focusing, although this symbol is meaningless and simply disregarded when operating according to automatic focusing. The scale relationship governing the gap or interval between the highest numerical value on the scale (for example, 18 meters) and the infinity position, is different from the scale relationship which applies to other subdivisions below the highest numerical value, such, for example, as the gap or interval between 12.5 meters and 18 meters. Thus the scale from 0.8 meter to 18 meters is a logarithmic progression, whereas the scale values between 18 meters and the infinity point, for indicating actual focused distances, are governed by a hyperbolic law. However, this is easily accomplished by properly designing the rise of the cams 24a, according to known optical principles, the cams having one slope characteristic during one portion of their lengths and another slope characteristic during another portion.

When adjusting the camera by the individual focusing means, the desired diaphragm aperture is adjusted (just as in the case of automatic focusing) by turning the diaphragm setting ring 22b. Although the control ring 36 with the cams 36a will rotate with the diaphragm setting ring, this does not cause any axial displacement of the front lens mount 28c nor affect the focus of the lens, because at this time (during individual focusing) the cam follower pins 36b remain out of contact with their cams 36a, being angularly or rotationally displaced beyond the ends of the cams, as seen in FIG. 4. Focusing is accomplished, of course, by turning the ring 30 manually, to bring the desired distance value on the scale 30c opposite the reference mark 21. The lens is focused for whatever distance is indicated by the scale.

The examples shown in FIGS. 2 to 4 are somewhat schematic or diagrammatic, and do not show the true position of the parts in the preferred commercial form. For example, the various scales in actual practice are marked on surfaces which are cylindrical or nearly cylindrical, as seen in FIG. 1, but in FIGS. 3 and 4 these scales have been shown as flattened out onto plane disks, to aid clarity of illustration and understanding. Moreover, in FIG. 2, some of the indicating parts are, for greater convenience, not shown in positions which correspond with those shown in FIGS. 3 and 4. Furthermore, the profile or face views of the cams in FIGS. 3 and 4 are accompanied by dot-dash lines to indicate schematically the rise or pitch of the respective cams in relation to each other and in relation to their associated cam follower pins. It may be noted also that the indicated pitch or rise of the cams is merely schematic. The actual cam outlines depend, of course, upon the optical characteristics of the lens and the structural characteristics of the mounting parts, and the pitch or rise characteristics of the cams can be calculated according to known optical principles by those skilled in the art, or can be determined empirically.

In the above described form of construction of the invention, the focusing mechanism can be optionally or selectively set for operation by two alternative methods of focusing, namely, what has here been called the "automatic" method and the "individual" method. According to a further feature of the invention, it is possible to provide still another operational position of the parts, for use in flash photography. This further development of the inventive idea is shown schematically or diagrammatically in FIG. 5, and much of the operation is the same as in the previous embodiment, so need not be further described.

In this second embodiment, instead of having merely one holding notch 30b in which the spring pressed detent ball 34 may engage, the ring 30 is now provided with a number of angularly spaced or circumferentially spaced notches 30b'', approximately diametrically opposite the notch 30b. The intervals between successive notches 30b'' correspond with the divisional intervals of the scales 30c and 22d. Moreover, the marginal flange or skirt of the ring 30 has a mark or symbol 31 diametrically opposite the mark A, which mark or symbol 31 may conveniently be in the form of a conventionalized streak of lightning, to indicate (when the ring 30 is turned to bring this symbol 31 opposite the main reference point 21) that the parts are set for flash photography.

A window notch 30e is cut into the edge of the setting ring 30 or its skirt or flange, to reveal a flash guide number scale 32a marked on the stationary member 32 when the ring 30 is turned to the proper position to bring this notch 30e opposite the scale 32a. Moreover, there is a reference point 30e' marked on the ring 30, for cooperation with the flash guide number scale 32a. Also, the diaphragm aperture setting ring 22b carries an additional mark 22f which is approximately diametrically opposite the reference mark 22e shown in FIG. 3.

The theory of flash guide numbers is well understood in the art. The flash guide number depends upon the speed or sensitivity of the film, the type and characteristics of the flash bulb, and the characteristics of the reflector in which the bulb is used. The flash guide number is equal to the product of the diaphragm aperture (expressed as an f number) multiplied by the distance from the camera to the principal object to be illuminated by the flash. Of course the flash guide number for distances expressed in feet will be different from the flash guide number (for the same bulb, reflector, and film) for distances expressed in meters. But this is well understood, and does not affect the present invention. In practical use, the flash guide number is independent of the shutter speed, because the shutter speed is set (when taking flash photographs) at a slow enough speed so that the duration of the exposure is determined by the duration of the flash, rather than by the opening and closing of the shutter blades.

The use of flash guide numbers, as well understood in the art, is a very convenient way of planning for flash photographs, since for a given film and flash bulb and reflector (and hence a given constant flash guide number) the setting of the camera according to the flash guide number automatically compensates for varying distances from the camera to the principal object, requiring a larger diaphragm aperture (smaller f number) when the object is farther from the camera, and a smaller diaphragm aperture (larger f number) when the object is closer to the camera.

Let it be assumed now that it is desired to take a flash photograph, and that with the particular film, flash bulb, and reflector being used the proper flash guide number is, for example, 25. The photographer first rotates the control ring 30 until the portion thereof marked with the flash symbol 31 is opposite the main index mark 21, and the mark 30e' is brought into registry with the graduation 25 on the flash guide number scale 32a. In this position, the spring pressed detent ball 34 drops into one of the notches 30b''. Of course if a different flash guide number were to be used, the ring 30 would be rotated a little one way or the other, to bring the mark 30e' opposite the proper graduation of the guide number scale 32a, and the detent ball 34 would then drop into the appropriate one of the notches 30b''. The ring 30 will then be held resiliently, by the detent 34, in the particular flash guide position for which it has been set. The follower pins 36b will overlie the cams 36a in contact therewith.

Figure 5:
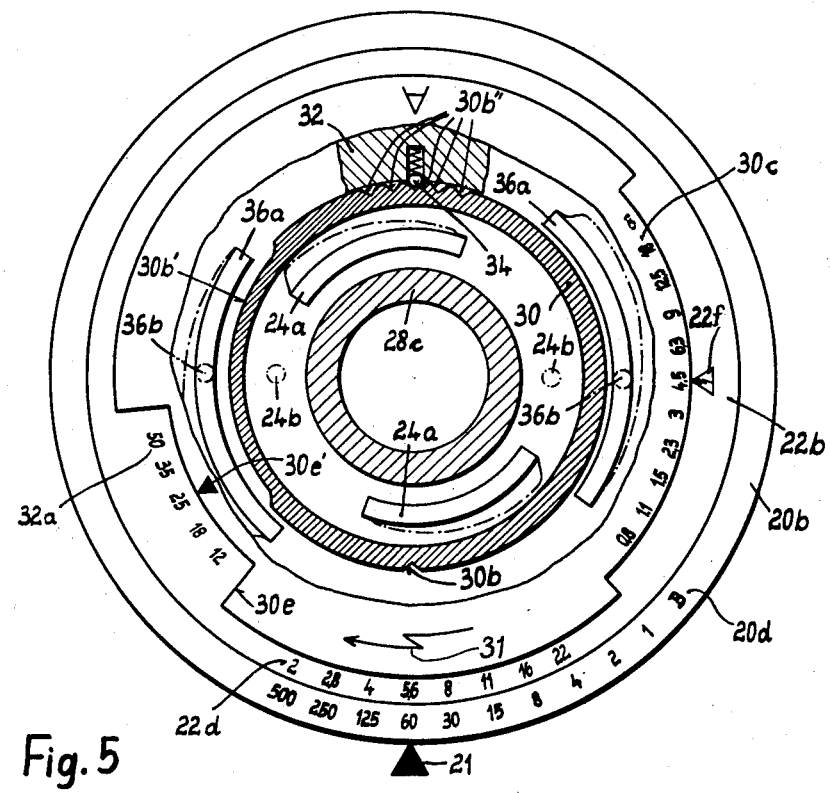
FIG. 5 is a view similar to FIG. 3, showing a different embodiment of the invention.

The coupled rings 20b and 22b are then manually rotated until the mark 22f registers with the graduation on the focus distance scale 30c which corresponds to the distance from the camera to the principal object to be photographed; for example, the distance of 4.5 meters, which is the setting shown in FIG. 5. This operation will automatically set up the proper corresponding diaphragm aperture (in this case, the aperture f:5.6) and, through the focusing mechanism parts 36a and 36b, the lens will be axially displaced to focus it for the distance of 4.5 meters. If, when rotating the coupled rings 20b and 22b, the resultant shutter speed adjustment is brought to too short or fast a speed for flash photography, the shutter speed ring 20b can be uncoupled from the diaphragm aperture ring 22b, by pushing the decoupling plunger 20e as previously described, and the shutter speed ring can then be separately adjusted (without changing the diaphragm aperture) to select a shutter speed suitable for a flash photograph.

In this embodiment, if it is desired to adjust the camera for a non-flash photograph, this is done by exactly the same procedure as previously described in connection with the first form of construction, shown in FIGS. 2–4. Both "automatic" and "individual" focusing methods are available in this construction of FIG. 5, exactly the same as in FIGS. 2–4. The scales and reference marks which are not required, for any particular mode or method of operation, will be masked by the external edge of the flange or skirt on the ring 30, to avoid confusing the operator.

The provision of a plurality of focusing mechanisms for axially focusing the lens, any selected one of which can be optionally brought into operation, permits focusing to be performed in a plurality of ways according to the expertness of the photographer or the nature of the contemplated photograph. A beginner will naturally prefer to use the "automatic" mode of operation, but the more experienced or expert photographer is free to change over to the "individual" mode of focusing, or to the "flash" operation, and is free to use his judgment in adjusting the camera whichever way he deems best. The changeover from one to another mode of operation can be readily and quickly performed, so that a camera according to the present invention can be instantly made ready for use according to whichever one of the modes is desired. When set for a particular mode or method of operation, the parts are held sufficiently firmly so that they will not be accidentally displaced unconsciously to a different method of operation.

The additional structural elements required for performing the invention in a practical way comprise mainly only the cam elements and the associated cam follower pins, because the remaining structural and indicating means are generally provided in any event in a conventional camera of practical construction. The provision of a special changeover switch or operating member is unnecessary, as the setting member of one of the focusing mechanisms (e.g., the focusing ring 30) is preferably arranged to serve for effecting the changeover. The result is a form of construction which has only relatively few structural parts, easy and inexpensive to manufacture and assemble, and sturdy in use. The parts can be manufactured with a minimum of simple machinery, and when assembled they operate with freedom from backlash, so that the present construction will satisfy the highest demands for accuracy in operation. The particular indicating means not required for a particular mode or method of operation are masked by the changeover member itself, thus providing a clear and readily understood assembly of operational elements without any need for providing supplementary parts.

Although a diaphragm aperture scale 22d has been illustrated in the drawings for convenience of quick understanding of the invention, it is obvious that such a scale need not necessarily be actually provided, especially if an exposure value scale is provided (as in Patent 2,829,574).

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera comprising a stationary support, a lens element having an optical axis and movable axially relative to said support for focusing, a diaphragm aperture adjusting ring rotatable about said axis, a manual focusing ring also rotatable about said axis, first cam means operated by rotation of said aperture adjusting ring for moving said lens element axially to focus it for a distance dependent upon the position of said aperture adjusting ring, without rotation of said manual focusing ring, second cam means operated by rotation of said focusing ring for moving said lens element axially to focus it for a distance dependent upon the position of said focusing ring independently of rotation of said aperture adjusting ring, manually shiftable means for selectively rendering either one of said cam means effective and the other one of said cam means ineffective, said manually shiftable selecting means comprising said manual focusing ring, said focusing ring having one predetermined position of orientation in which said first cam means is operative and said second cam means is inoperative, and being effective upon rotation to a substantial extent from said predetermined position, to render said first cam means inoperative and said second cam means operative.

2. A photographic camera comprising a stationary support, a lens element having an optical axis and movable axially relative to said support for focusing, a diaphragm aperture adjusting member, first focusing means for moving said lens element axially, second focusing means for moving said lens element axially independently of said first focusing means, means for selectively rendering one of said focusing means operative and the other of said focusing means inoperative, means operatively connecting said first focusing means to said aperture adjusting member for operation thereby, first distance scale means operative when said first focusing means is operative to indicate one limit of the depth of field as determined by the position of said aperture adjusting member, second distance scale means operative when said second focusing means is operative to indicate the distance for which said lens element is focused, a flash guide number scale, and adjusting means connected to said lens element and settable in conjunction with said flash guide number scale for altering the effect of one of said focusing means on the axial position of said lens element.

3. A photographic camera comprising a support, a lens mount and a lens element carried thereby and having an optical axis, said lens mount and lens element being movable axially relative to said support for focusing and also being rotatable relative to said support, a cam ring mounted for rotation on said support, a diaphragm aperture adjusting member operatively connected to said cam ring to rotate said ring, first cooperating cam and follower means operatively interposed between said lens mount and said cam ring for controlling the axial position of said lens mount from the rotational position of said cam ring, second cooperating cam and follower means operatively interposed between said lens mount and said support for controlling the axial position of said lens mount from the rotational position of said lens mount relative to said support, parts of said first cam and follower means being rotationally offset from corresponding parts of said second cam and follower means, means for rotating said lens mount to one rotational position for rendering said first cooperating cam and follower means operative and said second cooperating cam and follower means inoperative, and to a second rotational range of positions for rendering said first cooperating cam and follower means inoperative and said second cooperating cam and follower means operative, a distance scale marked on a member rotatable with said lens mount, a first reference point connected to move with said aperture adjusting member for moving over said distance scale to indicate thereon a focusing factor controlled by operation of said first cooperating cam and follower means, and a second reference point stationarily mounted in position to have said distance scale move past it upon rotation of said lens mount, to indicate on said scale a focusing factor controlled by operation of said second cooperating cam and follower means.

4. A construction as defined in claim 3, in which said focusing factor indicated by said first reference point is the distance of the near limit of the depth of field, and the focusing factor indicated by said second reference point is the distance of the point of sharpest focus in the field.

5. A construction as defined in claim 3, in which said focusing factor indicated by said first reference point is the distance of one limit of the depth of field.

References Cited in the file of this patent

UNITED STATES PATENTS

| | | |
|---|---|---|
| 1,627,722 | Balston | May 10, 1927 |
| 2,046,926 | Richardson | July 7, 1936 |
| 2,464,559 | Davenport et al. | Mar. 15, 1949 |
| 2,596,328 | Dorsey | May 13, 1952 |
| 2,901,957 | Fahlenberg | Sept. 1, 1959 |
| 2,925,765 | Gebele | Feb. 23, 1960 |